United States Patent

Furukawa

[11] Patent Number: 5,418,441
[45] Date of Patent: May 23, 1995

[54] DEFLECTION CORRECTING METHOD FOR A ROBOT

[75] Inventor: Yoshihisa Furukawa, Yamanashi, Japan

[73] Assignee: Fanuc, Ltd., Yamanashi, Japan

[21] Appl. No.: 920,476

[22] PCT Filed: Dec. 26, 1991

[86] PCT No.: PCT/JP91/01778

§ 371 Date: Aug. 24, 1992

§ 102(e) Date: Aug. 24, 1992

[87] PCT Pub. No.: WO92/12473

PCT Pub. Date: Jul. 23, 1992

[30] Foreign Application Priority Data

Dec. 28, 1990 [JP] Japan ................................. 2-416777

[51] Int. Cl.⁶ ............................................. G06F 15/46
[52] U.S. Cl. ................................. 318/568.22; 318/646
[58] Field of Search ............. 318/568.2, 568.19, 568.2, 318/568.22, 646, 650, 652; 364/474.35, 474.36; 901/9, 34

[56] References Cited

U.S. PATENT DOCUMENTS

| | | | |
|---|---|---|---|
| 4,143,923 | 1/1981 | Whitney et al. | 318/561 |
| 4,530,062 | 7/1985 | Inaba et al. | 318/632 X |
| 4,874,997 | 10/1989 | Daggett et al. | 318/568.2 X |
| 4,894,788 | 1/1990 | Stelzer | 318/568.19 X |
| 5,047,700 | 9/1991 | Szakaly | 318/568.2 X |
| 5,049,797 | 9/1991 | Phillips | 318/568.2 X |
| 5,053,973 | 10/1991 | Fujii et al. | 364/474.17 |
| 5,189,351 | 2/1993 | Torii et al. | 318/568.19 |
| 5,206,930 | 4/1993 | Ishikawa et al. | 318/568.18 |
| 5,263,113 | 11/1993 | Naitoh et al. | 318/646 X |

FOREIGN PATENT DOCUMENTS

| | | |
|---|---|---|
| 0188759 | 7/1986 | European Pat. Off. . |
| 61-48003 | 3/1986 | Japan . |
| 61-201304 | 9/1986 | Japan . |
| 62-31406 | 2/1987 | Japan . |
| 62-157790 | 7/1987 | Japan . |

OTHER PUBLICATIONS

*Proceedings of the 1988 IEEE International Conference on Robotics and Automation,* "Deflection Prediction for Serial Manipulators", vol. 1, pp. 482–487, 1988.

*Primary Examiner*—William M. Shoop, Jr.
*Assistant Examiner*—Brian Sircus
*Attorney, Agent, or Firm*—Staas & Halsey

[57] ABSTRACT

A method for correcting deflection intended to easily determine displacement of an endpoint of the robot caused by deflection of the robot, or the like, as well as to make accurate correction according to a respective configuration of the robot on the basis of deflection angles of individual axes of the robot. In this method, joint torques acting on the axes (W axis, U axis, ...) of the robot 1 are first determined, and the deflection angles of the axes are then determined on the basis of the joint torques. Command values for the axes are corrected on the basis of the deflection angle of each axis, whereby the endpoint position of the robot is accurately corrected to a command position $Xd0$. Further, on the basis of determined deflection angles of the individual axes, the robot 1 is made to recognize the actual position $Xd1$ of its deflected endpoint.

5 Claims, 5 Drawing Sheets

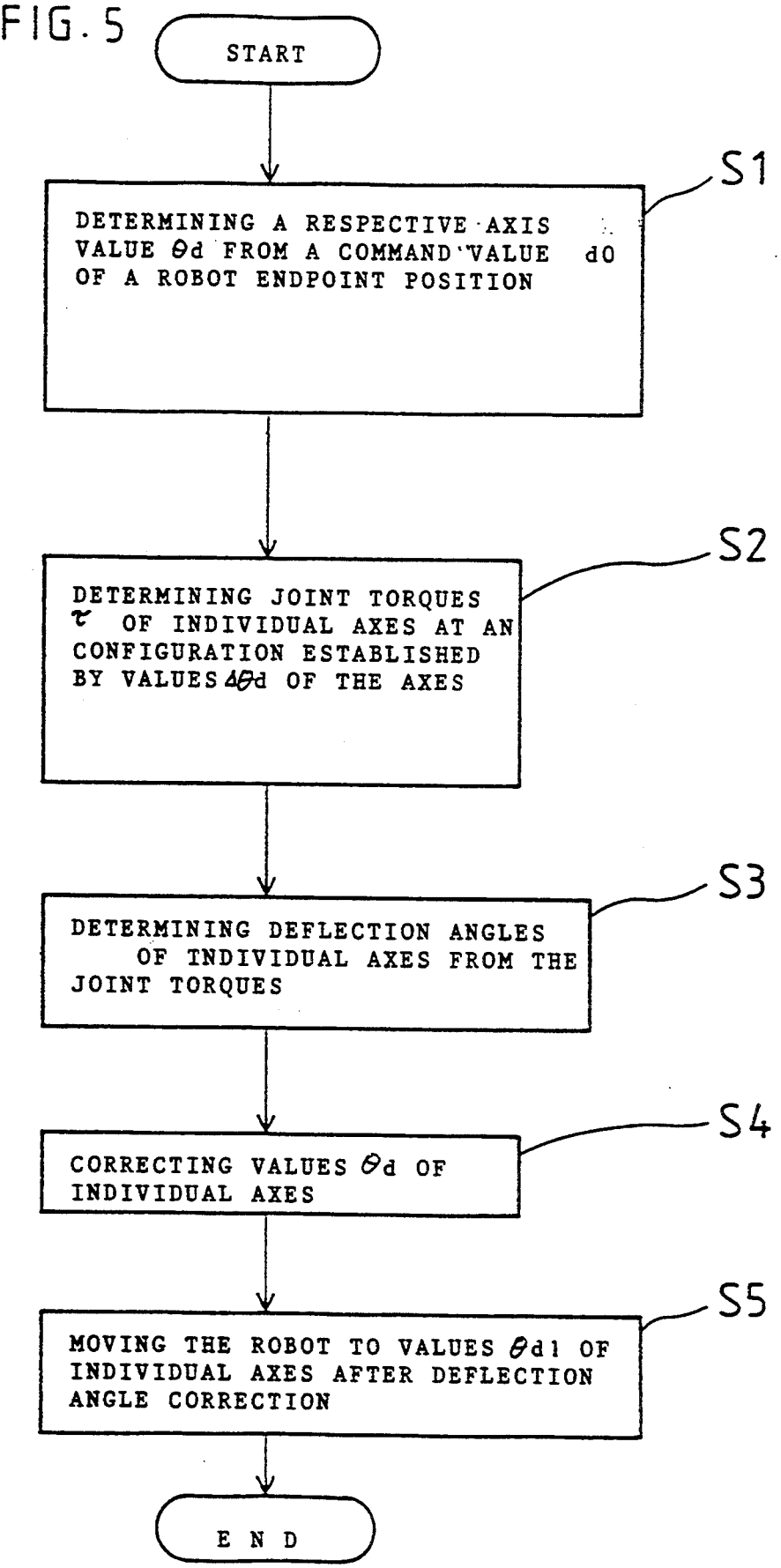

DEFLECTION CORRECTING METHOD FOR A ROBOT

BACKGROUND OF THE INVENTION

1. Field of the Invention

The present invention relates to a deflection correcting method for a robot, in which the deviation between commanded and actual endpoint positions caused by deflection of the robot is determined, and command values for individual axes are corrected on the basis of thus determined deviation, whereby the robot endpoint position is controlled to a desired position.

2. Description of the Related Art

Recently, robots have been utilized in various industrial fields, and there is an increasing demand for higher accuracy of the robot.

However, the robot endpoint position or robot hand position tends to be displaced due to the presence of deflection caused by robot's own weight and load on the endpoint, backlash in a reduction gear, or the like. In the case of a teaching/playback method, however, no such problem will be encountered because the robot can be played back to a taught position and configuration. More particularly, when teaching a position and orientation to the robot, the teaching is made including the displacement of the endpoint position caused by the above deflection, backlash, or the like, so that the robot can be exactly controlled to the thus taught position and configuration during the playback operation of the robot. However, in case that a robot is operated in accordance with an operation program prepared off-line without using the robot, to which the program is to be applied actually, the deviation occurs between the robot endpoint position commanded by the operation program and the actual robot endpoint position due to the aforementioned deflection, backlash or the like, thereby causing the endpoint position displacement. When the endpoint position is displaced, the robot cannot recognize its own accurate endpoint position, and therefore, positional accuracy of the robot will be affected adversely. Thus, the displacement of the robot endpoint position caused by such deflection, etc. must be corrected in a suitable manner compared with a command value.

Conventionally known as a correcting method is a method for correcting the displacement in accordance with load acting on the endpoint, for instance. However, according to this correcting method in which the configuration of a robot is not considered, merely a fixed amount of correction is provided irrespective of the configuration of the robot. Therefore, depending on the robot configuration, an appropriate correction value cannot be provided, thereby resulting in a failure in achieving accurate correction.

Also known is a method in which the displacement of a link is determined using an analytical technique based on strength of materials or a finite-element method to correct the displacement of the endpoint. However, this method is not only time-consuming but also costly in calculating the displacement.

The conventional correcting methods have such problems, and thus it is difficult to have a robot recognize the accurate position of its endpoint which actually in a deflected state.

SUMMARY OF THE INVENTION

An object of the present invention is to provide a deflection correction method for a robot, which is capable of easily determining displacement, caused by deflection, etc., of a robot endpoint from deflection angles of individual axes, as well as capable of simply and accurately correcting the displacement in accordance with the configuration of the robot, in a case where a robot operation program is prepared off-line, and the robot is operated according to this program.

Another object of the present invention is to provide a deflection recognizing method for a robot, which is capable of making a robot easily recognize an accurate position of a deflected robot endpoint or hand of the robot.

To achieve the above objects, in a deflection correcting method for correcting deflection of a robot, the present invention provides a deflection correcting method for a robot which comprises the steps of: determining joint torques acting on individual axes of the robot; determining deflection angles of the axes on the basis of said joint torques; correcting command values for the individual axes on the basis of said deflection angles of individual axes; and correcting the displacement of an endpoint position of the robot according to said corrected command values.

In the above deflection correcting method, preferably, the joint torques acting on the individual axes are determined in accordance with the configuration of the robot, and the deflection angles of the individual axes are determined on the basis of relationship equations, each indicative of a relationship between joint torque and deflection angle, the equation being provided for each of the individual axes.

Moreover, in a robot deflection recognizing method for a robot, characterized by letting a robot recongize the actual position of its endpoint with its deflection taken into account, the robot deflection recognizing method comprises the steps of: determining joint torques acting on individual axes of the robot; determining deflection angles of the axes on the basis of said joint torques; and letting the robot recognize the actual endpoint position on the basis of said deflection angles.

With regard to procedures for correcting deflection of a robot according to the method of the present invention, a brief explanation will be given. At first, the joint torques acting on individual axes of the robot are determined. Next, deflection angles of these axes are determined on the basis of the joint torques. Further, command values for the individual axes are corrected on the basis of the deflection angles of the axes. By means of the command values, the orientations of the individual axes are set. Further, by correcting the command values, the configuration of the robot can be corrected finely depending on the amount of the deflection. Thus, the displacement of the robot endpoint position can be corrected accordingly.

Alternatively, deflection angles of the individual axes can be determined on the basis of joint torques acting on the individual axes, and the robot is made to recognize the deflection angles. Accordingly, it is possible for the robot to recognize the actual position of its endpoint which is in a deflected state.

BRIEF DESCRIPTION OF THE DRAWINGS

FIG. 5 is a flowchart for embodying the present invention.

DESCRIPTION OF THE PREFERRED EMBODIMENT

Figure 1:
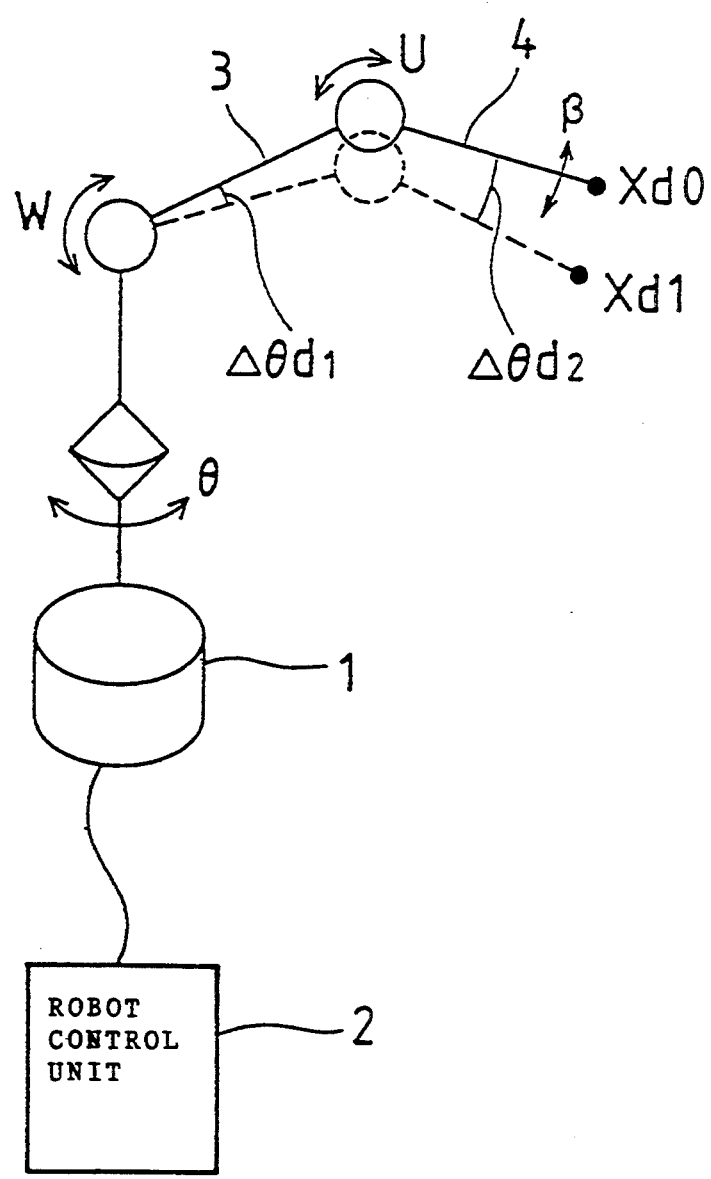
FIG. 1 is a diagram for illustrating a robot deflection correction method according to the present invention.

Referring to FIG. 1 for illustrating a robot correction method according to an embodiment of the present invention, a robot 1 of the present embodiment is constituted of four axes: $\theta$, W, U, and $\beta$ axes.

In accordance with an operation program prepared off-line, the robot 1 is controlled in such a manner that its endpoint (corresponding to the $\beta$ axis) is set to a commanded endpoint position vector XdO which is determined by a command value of the robot endpoint position supplied from a robot control unit 2. At that moment, the orientations of the W and U axes are displaced for amounts of $\Delta\theta d1$ and $\Delta\theta ed2$ by the weights of links 3 and 4, the load acting on the endpoint, backlash in a reduction gear associated with each of the individual axes or the like. As a consequence, the endpoint position vector is displaced from Xdo to Xd1. The displacement at this moment is determined in a manner mentioned below. In the present embodiment, however, it is assumed that the $\theta$ and $\beta$ axes are not subject to deflection.

First, a joint torque (a joint torque acting on an i-th axis) $\tau$ acting on one (W or U axis) of the axes is determined from the configuration of the robot (the angle of the i-th axis) $\theta d$ which corresponds to the robot endpoint position command value. That is, the configuration or angle to be assumed by an axis is determined in dependence on the commanded robot endpoint position. Once the angle of an axis is determined, the joint torque $\tau$ of the axis is determined by, for example, giving acceleration and velocity as "0" in robot dynamic equation. Thus, in accordance with the angle (configuration) of each axis, the joint torque $\tau$ can be determined for each axis. Next, the deflection angle $\Delta\theta d$ of each axis (the deflection angle of the i-th axis) is determined, the angle being formed when the axis concerned is deflected due to the application of the joint torque $\tau$ to the same axis.

Figure 2:
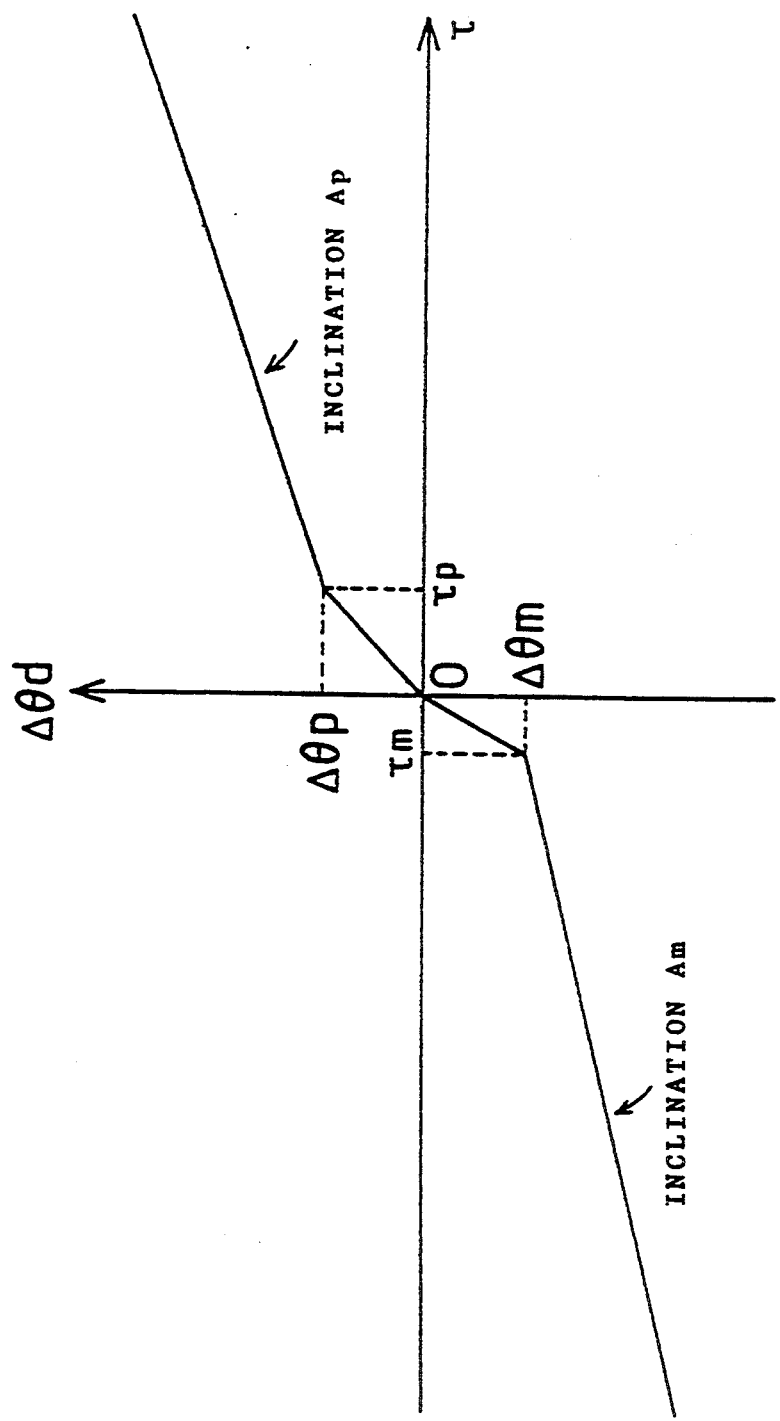
FIG. 2 is a displacement model diagram showing the relationship between joint torque and deflection angle.

FIG. 2 is a displacement model diagram showing a relationship between the joint torque $\tau$ acting on a certain axis and the deflection angle $\Delta\theta d$. The displacement model diagram is prepared for each axis. In the drawing, the deflection angle $\Delta\theta d$ changes at an inclination Ap in a positive region of the joint torque $\tau$ and at an inclination Am in a negative region thereof. Assuming that backlash occurs when the absolute value of the joint torque $\tau$ is small, inflection points are provided at the coordinate positions of ($\tau p$, $\Delta\theta p$) and ($\tau m$, $\Delta\theta m$).

Figure 3:
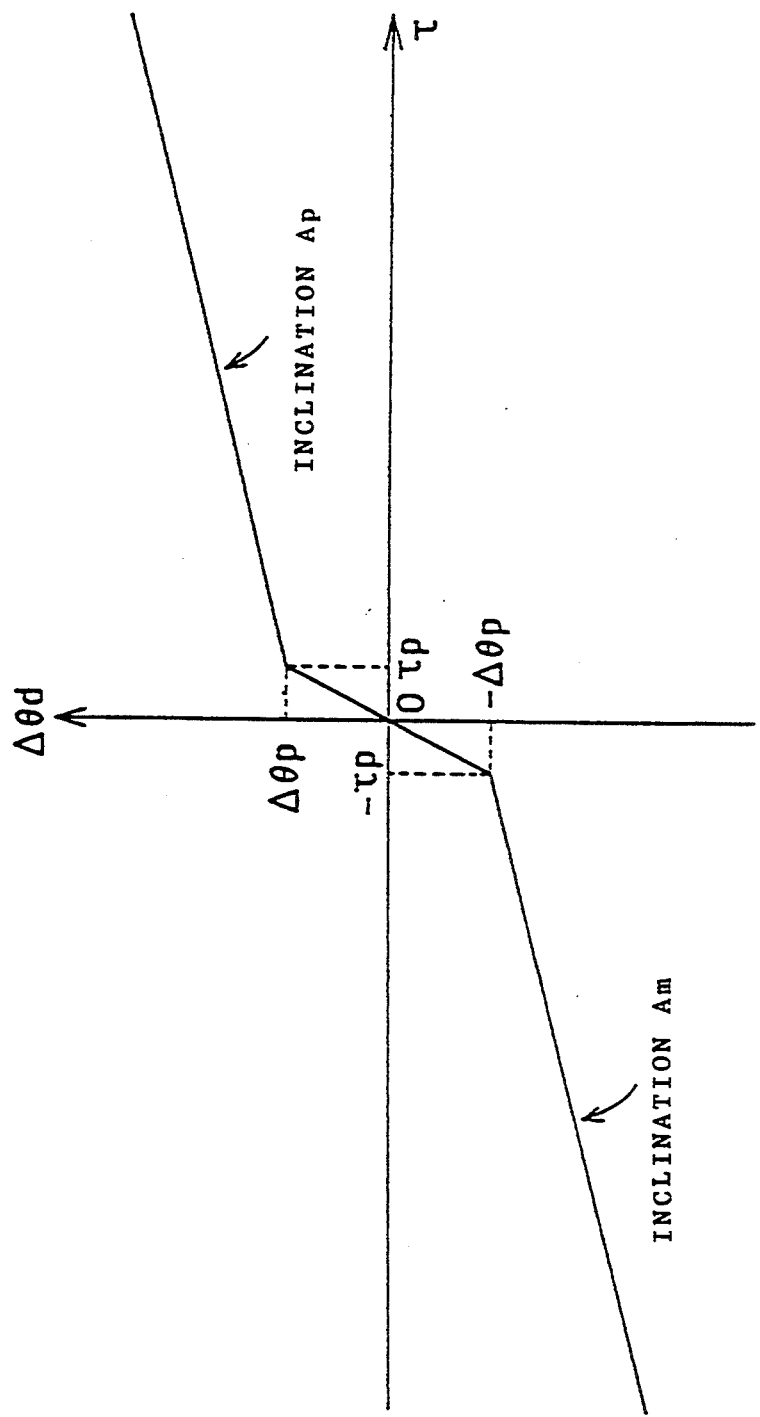
FIG. 3 is a displacement model diagram showing the relationship between joint torque and deflection angle in a case where the joint torque has no anisotropy in positive and negative directions of the joint torque.

FIG. 3 is a displacement model diagram showing a state in which there is no anisotropy in positive and negative regions of the joint torque $\tau$. In the drawing, the deflection angle $\Delta\theta d$ changes at the same inclination Ap in both the positive and negative regions of the joint torque $\tau$, and assuming that backlash occurs, inflection points are provided at the coordinate positions of ($\tau p$, $\Delta\theta p$) and ($-\tau p$, $-\Delta\theta p$).

Figure 4:
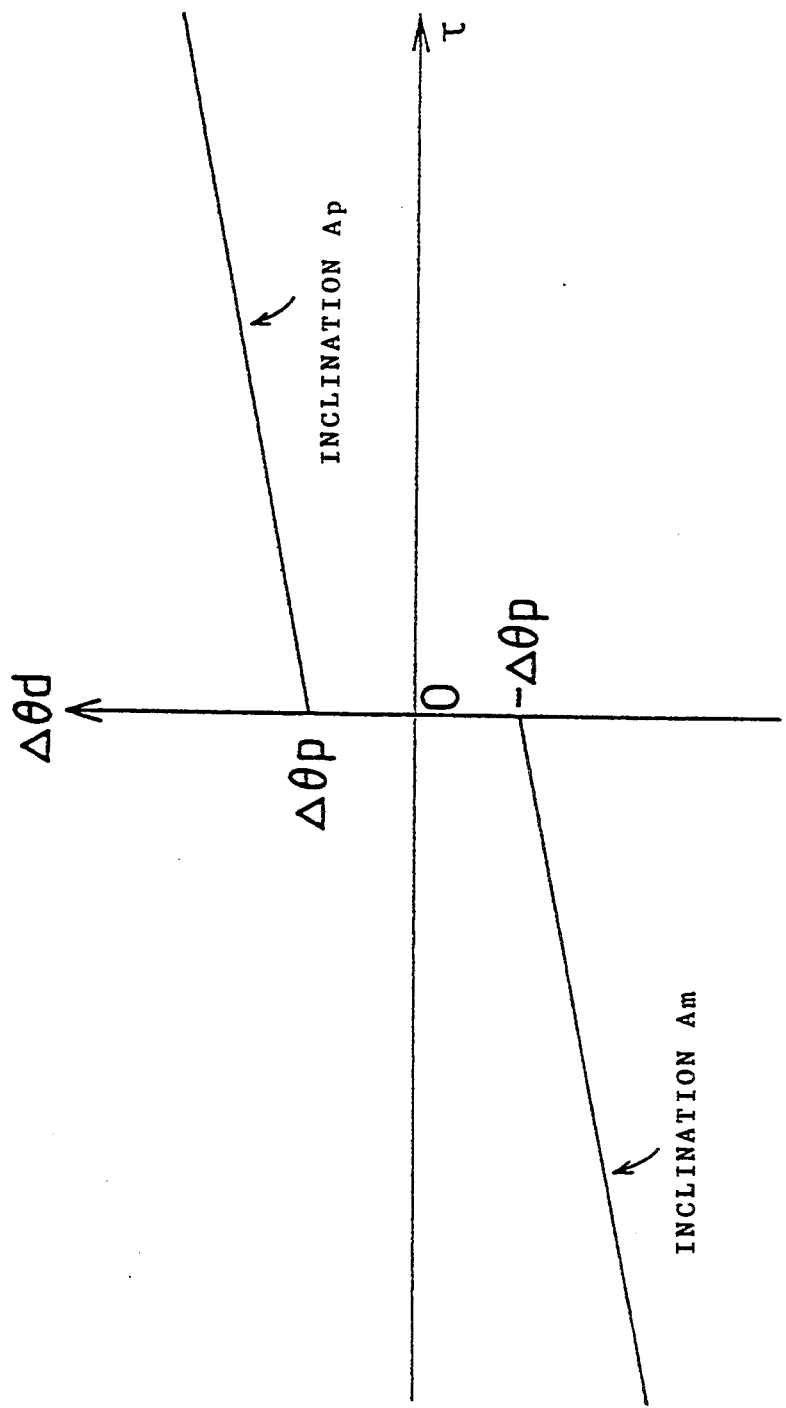
FIG. 4 is a displacement model diagram showing the relationship between joint torque and deflection angle in a ease where the joint torque has no anisotropy in positive and negative directions of the joint torque, and a deflection angle on a point of displacement is represented by $\Delta\theta p=0$.

FIG. 4 is a displacement model diagram in a case where no anisotropy is present in positive and negative regions of the joint torque $\tau$, with inflection points provided on the $\Delta\theta d$ axis, and the torques on these points can be expressed by the equation $\tau p = \tau m = 0$.

The displacement model diagrams shown in FIGS. 3 and 4 are special examples of the displacement model diagram shown in FIG. 2. Actually, in most cases, there is no anisotropy between the joint torque $\tau$ and the deflection angle $\Delta\theta d$, so that it is practical to utilize the displacement model diagram shown in FIG. 3 or 4. Furthermore, each of the displacement mode 1 diagrams shown in FIGS. 2 through 4 can be expressed by a combination of simple linear equations. An arithmetic program concerned with a relationship equation between the joint torque $\tau$ and the deflection angle $\Delta\theta d$ is previously stored in the robot control unit. Thus, once the joint torque $\tau$ acting on a given axis is obtained, the deflection angle $\Delta\theta d$ of the axis can be determined by using the relationship equation which corresponds to any one of the displacement model diagrams shown in FIGS. 2 through 4. In this manner, the displacement of each of the axes is determined. As a result, an actual position (Xd1) of the endpoint of the robot can be determined.

The configuration $\theta d$ (command value) of each axis is corrected by using the deflection angle $\Delta\theta d$. Then, the configuration command value (command angle after the correction of the deflection angle of the i-th axis) $\theta d1$ is determined by the following equation (1):

$$d1 = \theta d - \Delta\theta d \qquad (1)$$

When an angle $\theta d1$ obtained by correcting deflection angle is commanded to the associated axis whose angle changes by an amount of $\Delta\theta d$ due to the deflection, and thus $\theta d1 + \Delta\theta = \theta d$, so that the actual angle of each axis is corrected. As a consequence, the robot can be controlled for a desired robot configuration (endpoint vector XdO).

When a work coordinate system is taught and set to the robot control unit 2, this unit 2 needs to recognize an actual position of its endpoint which is in a deflected state. In this case, a calculation is made using the following expression (2) to determine the configuration $\theta d2$, corresponding to the actual endpoint position, of the axis concerned.

$$\theta d2 = \theta d + \Delta\theta d \qquad (2)$$

When the robot endpoint position is set to predetermined position in order to set the work coordinate system, the robot control unit 2 recognizes only the configuration (angle) $\theta d$ of each axis in which deflection or the like is not included in spite of the fact that actually the endpoint position is positioned with the deflection or the like included. Thus, the joint torque $\tau$ of each axis is determined on the basis of the configuration $\theta d$ of the axis concerned, and the deflection angle $\Delta\theta d$ is determined by the relationship equation between the joint torque $\tau$ and the deflection angle $\Delta\theta d$. Next, the detected configuration $\theta d$ of the axis and the deflection angle $\Delta\theta d$ are added as shown in expression (2) to determine the configuration $\theta d2$ of the axis corresponding to the actual endpoint position. Then, the endpoint is positioned to a respective one of positions determined beforehand for the setting of the work coordinate system. With this method, the robot control unit 2 is enabled to recognize a respective one of actual endpoint positions, i.e., the actual work coordinate system.

Subsequently, coordinate transformation is made by transforming the coordinate system associated with the operation program prepared off-line into the aforesaid actual work coordinate system to transform the operation program into one based on the actual work coordinate system.

FIG. 5 is a flowchart showing the procedures for embodying the method according to the present invention. In the drawing, reference numerals following S respectively denote step numbers. Here, it is assumed that the operation program is transformed into the operation program based on the actual work coordinate system.

(S1) From the robot endpoint position command value Xd0 commanded from the operation program, the robot control unit 2 determines angles of the individual axes (orientations of the axes) $\theta d$, as command values before correction, in accordance with the following expression (3):

$$\theta d = F^{-1} (XdO) \quad (3)$$

where the function F provides the commanded endpoint position vector, which is determined according to the value $\theta d$ of the each axis.

(S2) The robot control system 2 determines the joint torques $\tau$ of the individual axes on the basis of the angles $\theta d$ of the axes using the robot motion equations.

(S3) Deflection angles $\Delta\theta d$ of the individual axes are determined on the basis of the joint torques $\tau$ determined in the previous step by using relationship equations between joint torque $\tau$ and deflection angle $\Delta\theta d$, these equations corresponding to the displacement model diagrams (see, FIGS. 2 through 4) and each being prepared for a related one of the axes.

(S4) The robot control unit 2 corrects the angles 0d of the individual axes corresponding to the command values XdO by using the expression (1), thereby determining the angles $\theta d1$ of the axes after correcting the deflection angle.

(S5) The robot control unit 2 supplies the individual axes with commands by which the axes are moved to assume their orientations corresponding to the angles $\theta d1$ of the axes determined after correcting deflection angle.

As described above, the deflection angles $\Delta\theta d$ of the individual axes of the robot 1 are determined on the basis of the joint torques $\tau$ acting on the axes so that the configuration of the robot 1 can be corrected according to the deflection angles $\Delta\theta d$. Thus, it is possible to simply determine the deflection angles $\Delta\theta d$ of the individual axes for each configuration of the robot 1. This makes it possible to accurately correct the endpoint displacement of the robot 1 in accordance with the configuration of the robot 1 by utilizing the deflection angles $\Delta\theta d$.

Further, utilizing the deflection angles $\Delta\theta d$, it is possible to let the robot recognize the position of its deflected endpoint before correcting the deflection, so that the actual position can be accurately set when teaching and setting the work coordinate system or the like to the robot.

In the above embodiment, the aforesaid correction of deflection is carried out by the robot control unit; however, an operation program subjected to the deflection correction may be created by using the device for making the off-line operation program. That is, this kind of operation program may be prepared by executing the procedures of the above steps (S1) through (S4) to calculate the orientations (angles) $\theta d$ of the individual axes after correcting deflection using the off-line operation program creation device instead of the robot control unit. Then, the robot control unit may transform the operation program into that of the work coordinate system, so that the control can be made on the basis of the transformed operation program.

Furthermore, although the four-axis robot is exemplified in the above description, the present invention may be applied to a robot with any number of axes.

In addition, in the above embodiment, the $\theta$ axis is assumed not to be displaced due to the presence of deflection or the like; however, vertical displacement may be taken into account in the application of the present invention.

As seen from the above descriptions, according to the present invention, the deflection angles of the individual axes of the robot are determined on the basis of the joint torques acting on these axes, and the configuration of the robot is corrected according to the determined deflection angles. Thus, it is possible to easily calculate the deflection angles of the individual axes for each configuration of the robot, so that the endpoint displacement of the robot can be corrected accurately in accordance with the configuration of robot by utilizing the deflection angles.

Further, it is possible to let the robot recognize the position of the deflected endpoint or hand, before correcting the deflection, by utilizing the deflection angles, thereby improving accuracy in position control of the robot or the like.

I claim:

1. A deflection correcting method for a robot, comprising the steps of:
   a) determining joint torques acting on individual axes of the robot;
   b) determining deflection angles of the individual axes on the basis of the joint torques;
   c) correcting command values for the individual axes only on the basis of the deflection angles of the individual axes, the deflection angles of the individual axes being determined on the basis of relationship equations of a displacement model showing a relationship between the joint torque and the deflection angle, the equation being provided for each of the individual axes; and
   d) correcting the displacement of an endpoint position of the robot according to the corrected command values.

2. A deflection correcting method for a robot according to claim 1, wherein the joint torque action on the individual axes are determined in accordance with a configuration of the robot.

3. A deflection recognizing method for a robot, the robot recognizing the actual position of its endpoint with its deflection taken into account, comprising the steps of:
   a) determining joint torques acting on individual axes of the robot;
   b) determining deflection angles of the individual axes on the basis of the joint torques; and c) letting the robot recognize the actual endpoint position on the basis of the deflection angles.

4. A deflection correction method for a robot, comprising the steps of:
 a) storing a relationship equation between a joint torque and a deflection angle in a control unit;
 b) detecting the joint torques acting on individual axes of the robot based on a detected configuration of an axes;
 c) determining the deflection angle using the relationship equation;
 d) detecting the displacement of the axes; and
 e) determining, based on the addition of the detected configuration and the deflection angle, an actual end point position.

5. A deflection correcting method for a robot, comprising the steps of:
 a) storing an end point position command value;
 b) determining angles of individual axes as command values before correcting a deflection angle;
 c) determining, using robot motion equations, joint torques of the individual axes;
 d) determining deflection angles of the individual axes based on the determined joint torques;
 e) correcting angles of the individual axes corresponding to the command values to determine the angles of the individual axes after correcting the deflection angle; and
 f) supplying the individual axes with commands to move the axes to correspond to the angles of the individual axes after correcting the deflection angle.

* * * * *